United States Patent
Gleim et al.

[11] Patent Number: 6,005,735
[45] Date of Patent: *Dec. 21, 1999

[54] TEMPERATURE MONITORING PROCESS AND DEVICE

[75] Inventors: Günter Gleim; Hermann Link; Friedrich Heizmann, all of Villingen-Schwenningen, Germany

[73] Assignee: Deutsche Thomson-Brandt GmbH, Villingen-Schwenningen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,225

[22] PCT Filed: Sep. 3, 1993

[86] PCT No.: PCT/EP93/02374

§ 371 Date: Apr. 18, 1995

§ 102(e) Date: Apr. 18, 1995

[87] PCT Pub. No.: WO94/06188

PCT Pub. Date: Mar. 17, 1994

Related U.S. Application Data

[63] Continuation of application No. 08/367,336, Apr. 18, 1995, abandoned.

[30] Foreign Application Priority Data

Sep. 4, 1992 [DE] Germany .................... 42 29 344

[51] Int. Cl.⁶ .................... G11B 15/18
[52] U.S. Cl. .................... 360/69; 360/73.04; 360/75; 340/584
[58] Field of Search .................... 360/69, 97.02, 360/97.03, 60, 75, 73.04, 73.05, 73.06, 71, 70; 369/53, 233, 184, 492, 185, 557; 340/584

[56] References Cited

U.S. PATENT DOCUMENTS

| | | | |
|---|---|---|---|
| 3,735,219 | 5/1973 | Kahn et al. | 318/135 |
| 4,879,705 | 11/1989 | Aoyagi et al. | 360/72.2 X |
| 5,115,225 | 5/1992 | Dao et al. | 340/584 |
| 5,287,478 | 2/1994 | Johnston et al. | 360/75 X |
| 5,327,315 | 7/1994 | Nouchi et al. | 360/69 X |
| 5,544,138 | 8/1996 | Bajorek et al. | 369/54 |
| 5,557,550 | 9/1996 | Vigil et al. | 364/557 |
| 5,566,077 | 10/1996 | Kulakowski et al. | 360/97.02 X |
| 5,921,493 | 7/1999 | Kohno | 360/71 X |

Primary Examiner—Andrew L. Sniezek
Attorney, Agent, or Firm—Joseph S. Tripoli; Joseph J. Laks; Francis A. Davenport

[57] ABSTRACT

A temperature monitoring process and device for controlling the operation of an recording and playback device in such a way that overheating is avoided. A temperature threshold is provided above which an economical operation mode is switched in, reducing power consumption and further heating.

12 Claims, 1 Drawing Sheet

TEMPERATURE MONITORING PROCESS AND DEVICE

This is a continuation of application Ser. No. 367,336, filed Apr. 18, 1995, now abandoned.

It is known that electrical appliances cause power losses during their operation, as a result of which a corresponding generation of heat arises. This generation of heat occurs in particular in output stages for loads connected downstream. If a fault occurs, such as for example a shortcircuit, a mechanical obstruction or the like, while these loads are operating, excessive generation of heat is to be expected. This leads to a high degree of heating, in which case temperatures occur which can lead to the output stages or the entire appliance being destroyed.

In the case of an appliance which stores information on a tape and/or reads information from a tape, such as for example a video recorder, mechanical faults can occur, for example in a drive for the storage tape, that is to say for example the video cassette. In such cases, the output stages which actuate a corresponding drive motor are heated excessively.

It is known to equip appliances in such a way that the temperature of the output stages or of the appliance is monitored, and that the respective load is no longer actuated in the case of faults of the aforementioned type in which a maximum operating temperature, also referred to as alarm temperature below, is reached.

It is also known to stipulate a lower temperature value which corresponds to a so-called warning temperature which is exceeded before the alarm temperature is reached. Above the warning temperature, the connected load is powered down from its normal operation into an idle state or from its instantaneous mode of operation into a lower mode of operation.

Problems can occur here if the fault comes from a different source or is caused by an incident. Then, despite the reduction of the mode of operation, the alarm temperature is reached. For this reason, when the warning temperature is reached the appliance must be powered down.

In a video recorder in which, for example during searching, a mechanical impedance occurs in the region of the video cassette, which can occur for example with worn or cheap cassettes, that is to say both the drive motor and other loads, such as a drum motor, are initially slowed down when the warning temperature is reached and stopped when the alarm temperature is reached. By means of this two-stage process, excessive stressing, stretching and damage to the video tape can be avoided as far as possible. However, a viewer is aware of an abrupt interruption in operation.

The object of the present invention is to develop a temperature monitoring system in an appliance in such a way that on the one hand critical operating temperatures are largely prevented from being exceeded and on the other hand the adverse effects for means or living creatures which interact with the appliance are reduced.

According to the invention, the temperature of the appliance or inside the appliance, for example in the region of the output stage, is monitored. If the temperature exceeds a first temperature value which corresponds to a temperature which is designated here as the economical temperature, the output signal of that output stage which is just actuating a load is changed in such a way that less power is fed to the load than before. Thus, the drop in power within the output stage and therefore also the generation of heat become smaller. This can a) lead to a decrease in temperature, in which case at a later time the load may possibly be completely actuated again, b) lead to a stabilization of temperature, the load continuing to be operated at reduced power, or c) may, in the event of a fault, lead to a further increase in temperature, in which case at a later time a second temperature value is reached which corresponds to a warning temperature at which only a highly reduced amount of power is fed to the respective loads. As a result, the load or loads may be switched off without damage if the alarm temperature is reached later.

The invention is based on the fact that when the load is actuated with reduced power on the one hand the warning temperature can largely be prevented from being reached and on the other hand the adverse effects for means or living creatures which interact with the appliance are greatly reduced in comparison with known systems.

For the example of the video recorder this means for example that in the case of faults during searching the motor for the tape drive is operated with reduced power when the economical temperature is reached. As a result, a film which is to be played continues to be visible to a viewer but at a reduced speed. This is only of secondary importance for the viewer in comparison with the appliance failing completely for at least some time.

Similar considerations also apply for other modes of operation of the video recorder such as rapid rewinding or the like.

It is an advantage of the invention that output stages for actuating loads which are connected downstream no longer to be dimensioned such that all possible faults are allowed for This also includes other thermal stresses, such as for example solar radiation, insufficient circulation of air for ventilation, or the like.

As a result of the correspondingly smaller dimensioning of discretely designed circuits cheaper components can be used for the output stages. If one output stage is realized as an integrated circuit, less space is correspondingly required on the (IC) semiconductor surface, as a result of which costs can also be saved. This also applies equally to discrete components on the printed circuit board.

If two or more economical temperatures are provided, a stepped operation can take place. As a result, compromises can be found between possible further heating and the corresponding adverse effects.

Further features, advantages and details of the invention are explained in the following exemplary embodiments with reference to the drawing, in which.

Before closer details are given on the description of the exemplary embodiments, it is to be noted that the blocks illustrated individually in the figures only serve for better comprehension of the invention. Usually, individual blocks or several of these blocks are combined to form units. These can be realized in integrated or hybrid technology or as a programme-controlled microcomputer or as part of a programme which is suitable for controlling it.

The elements illustrated in the individual stages can however also be realized separately.

Figure 1:
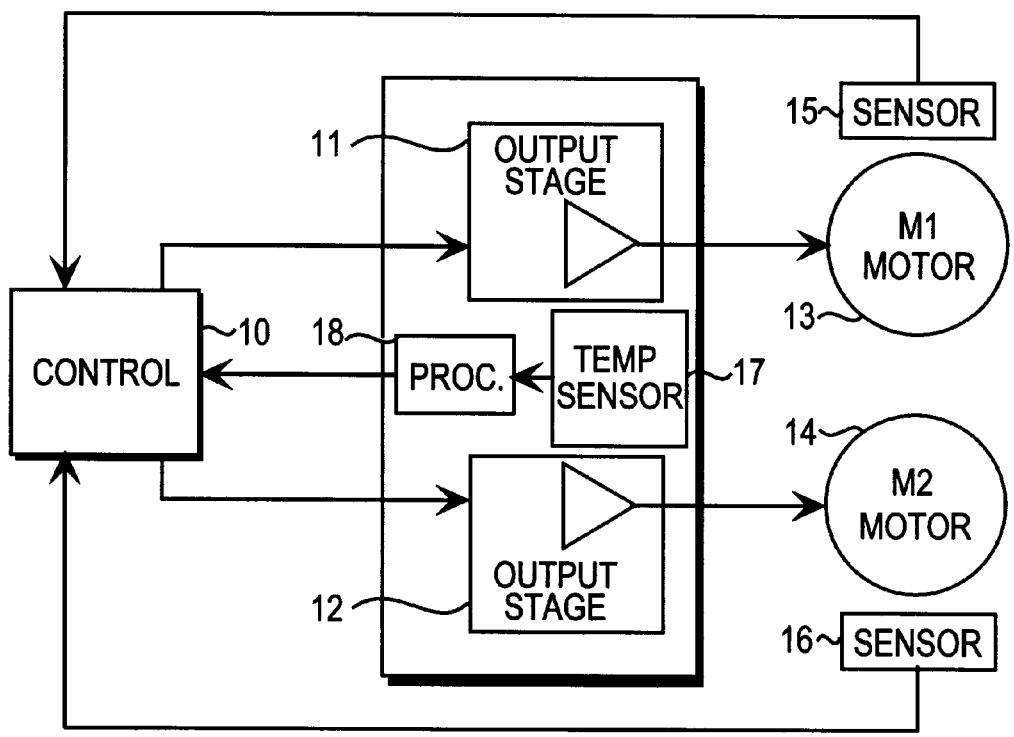
FIG. 1 shows an exemplary embodiment of the use of a video recorder.

FIG. 1 shows a control device 10 which may be constructed for example as a microcomputer, for example with the TMP90CK42 from Toshiba or the ST9040 type from Thomson, which actuates a first output stage 11 and a second output stage 12. These output stages 11, 12 can be of discrete design as power output stages or driver output stages or be integrated in a common unit, such as for example an integrated circuit, and feed a first motor 13, which in this exemplary embodiment will be a drive (capstan) motor of a video recorder with the type designation F2QKB30T from Sankio or VMX 800 from Sony, or a second motor 14 which here is a drum motor for example of the S2PSLPTT03 design from Thomson. In order to monitor the rotational position and/or rotational speed, appropriate sensors 15, for example an MRH element of the DM 211 types from Sony or 16, for example a photoelectric beam, are provided. The sensors 15, 16 transmit their signals to the control device 10. The signal of 3 temperature sensor 17 which detects the temperature of the output stages 11, 12 is pre-processed in this exemplary embodiment by a signal, pre-processing stage 18 and a corresponding temperature signal Ts is fed to the control device 10.

The temperature sensor 17 can be arranged in the region of the output stages 11, 12 or integrated therewith, as it is indicated in FIG. 1.

In a preferred embodiment, a $U_{BE}$ series of transistors integrated with amplifying means serves as temperature sensor 17.

Figure 2:
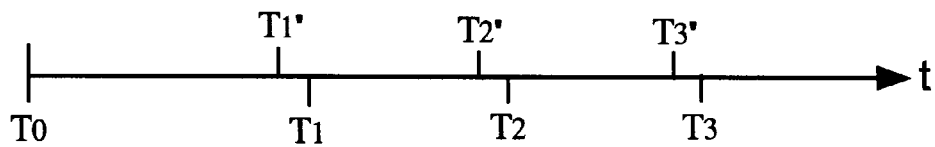
FIG. 2 is a symbolic representation of the dependence of various operating states on the operating temperature.

Below, a possible function of the exemplary embodiment according to FIG. 1 is described in conjunction with FIG. 2.

At the start of operation of the video recorder in which the circuit in FIG. 1 is arranged, the search mode, that is to say accelerated playing mode, is started in a manner known per se. As a result, the drive (capstan) motor 13 and the drum motor 14 are actuated. The required speeds of revolution for the motors 13, 14 are prescribed on the basis of an adjustment by the control device 10. The output stages 11, 12 convert the signals supplied by the control device 10 into suitable actuation signals for the motors 13, 14.

During correct operation, the temperature measured by the sensor 17 during the entire duration of operation will be in the range from T0 to T1 which corresponds to the normal operating temperature range. Correct operation is understood here to be the use of a video cassette which is in a satisfactory mechanical condition, while avoiding extraordinary thermal influences, such as solar radiation, impedance of air circulation or the like.

The preprocessed signal Ts assumes a first voltage value, for example zero volts, in normal operation. The control device 10 actuates the output stages 11, 12 in such a way that the motors 13, 14 rotate at a speed which is normal for search mode.

However, if the device is not operating correctly in the way considered here, the normal operating temperature range is departed from after some time and temperatures in the range from T1 to T2 which corresponds to a so-called economical range, are measured by the sensor 17. The signal Ts has for example a clocked state if only one line is provided for transmitting the signal Ts. In response to this, the output stage 11 is actuated by the control device 10 in such a way that the speed of revolution of the drive motor 13 is reduced in such a way that an adverse effect occurs which is hardly perceptible to a viewer. The reduction in the speed of revolution of the drive motor only is appropriate since in this way on the one hand the load is throttled with a high power consumption and on the other hand the image detection by a video drum connected to the drum motor 14 is not adversely affected.

If this reduction in power is not sufficient to prevent further heating, after a further period temperatures in a warning range from T2 to T3 are measured. The signal Ts then assumes a second voltage value, for example that of a positive supply voltage. In response to this, all the loads in operation, that is to say in particular the motors 13, 14 are actuated by the control device 10 via the output stages 11, 12 in such a defined way that the motors 13, 14 are slowly powered down and an idle state is reached without the video tape being destroyed. However, this is still not sufficient to prevent the temperature rising, so temperatures in the range above T3 are measured at a later time. This corresponds to a so-called alarm range in which there is an acute risk for the output stage 11 and possibly for the entire appliance. In this range, the signal Ts retains the second voltage value. The motor 13 is switched off completely by the output stage 11 or by means integrated with the output stage 11. One means can be for example the signal which is supplied by the signal preprocessing stage 18 above T3 and which acts internally on the output stages 11, 12 in a direct path avoiding the control device 10 so that hardware deactivation of the output stages and their loads can be performed.

This operating state is particularly appropriate since, particularly when integrating several output stages in one integrated circuit, it is quite possible for the cause of the excessive heating to be output stages which do not usually generate any unusual amount of heat. Since the deactivation is not brought about by the control device 10, self-protection of the output stages 11, 12 is realized, the said self-protection also being effective in the event of the control device 10 failing.

If the temperature drops below the temperatures T1, T2, T3 again as a result of the initiated measures, the corresponding actuations of the operational ranges which then occur can be carried out. This means for example if the drop in power is reduced as a result of the warning operation, such that the temperature drops below the warning temperature T2, then economical operation is actuated. Normal actuation occurs if there is further reduction in temperature below T1.

At the same time, a hysteresis may be provided so that the corresponding actuations at temperatures T1', T2', T3' (see FIG. 2) which lie below the temperatures T1, T2 and T3 are initiated.

The process described above for the search mode of a video recorder proceeds in a corresponding way for fast forward and fast rewind. In these modes of operation the drive motor 13 and the output stage 11 are also heavily loaded so that excessive generation of heat can occur.

Versions of the aforesaid exemplary embodiment can have at least one of the following variations:

instead of one economical range a plurality of them can also be provided;

instead of the incremental reduction when the economical temperature (T1) is reached, an essentially continuous reduction of power may be provided;

instead of reducing the drive power of a video drive motor, other loads can also be actuated to a reduced degree, such as motors of a compact disc (CD) player, of a tape player or tape cassette player (compact cassette CC or digital compact cassette DCC), or an electrically driven land vehicle, air vehicle or watercraft or else other loads such as an electric light source, for example of a projection device, or the like:

the various operating states, normal operation, economical operation, warning operation, alarm can be indicated by optical and/or acoustic means;

alarm mode can be dispensed with;

the value of the temperature signal Ts can be varied by a plurality of lines being used which are fed with a voltage in accordance with a prescribed code, such as for example the binary code;

when only one line is used to transmit the temperature signal Ts its value can be set by varying the frequency and/or the voltage value of the transmitted signal.

We claim:

1. A recording and replay device, comprising;

a capstan motor for transporting a magnetic tape and subject to varying mechanical loading;

a drum motor for rotating a video drum relative to said magnetic tape for video detection from said magnetic tape;

a first power amplifier coupled to supply power to cause continuous rotation said capstan motor, said first power amplifier being subject to temperature rise in accordance with said power supplied to said capstan motor when subject to said varying mechanical load;

a second power amplifier coupled to said drum motor to cause continuous rotation said video drum;

a temperature sensor coupled to said first and second power amplifiers for measuring a temperature thereof; and, a controller coupled to said sensor and said first and second power amplifiers for controlling rotational speed of said motors in accordance with said measured temperature, wherein an operating mode within a normal range of temperatures, said capstan and drum motors are controllably driven by said first and second power amplifiers and rotate continuously, each with normal rotational speeds, and within a second range of temperatures higher than said normal range, said controller controls said first power amplifier to reduce power to said capstan motor, and in accordance with said reduced capstan motor power said temperature in said first power amplifier is reduced.

2. The recording and replay device of claim 1, wherein said operating mode is a picture search mode.

3. The recording and replay device of claim 2, wherein said second range of temperatures, said drum motor maintains continuous rotation at said normal rotational speed and video detection from said magnetic tape is sustained.

4. The recording and replay device of claim 1, wherein said operating mode is a wind mode.

5. The recording and replay device of claim 1, wherein said second range of temperatures said capstan motor rotates with a rotational speed less than said normal rotational speed.

6. The recording and replay device of claim 1, wherein said second range of temperatures, said controller controls said first power amplifier to reduce power to said capstan motor until said temperature in said first power amplifier returns to said normal range of temperatures.

7. The recording and replay device of claim 1, wherein said second range of temperatures, said controller controls said second power amplifier to sustain power supply to said drum motor and maintain continuous rotation at said normal rotational speed.

8. The recording and replay device of claim 1, wherein said temperature sensor forms part of said power amplifiers.

9. A method for controlling a recording and replay device comprising a capstan motor driven by a first power driver stage and a drum motor driven by a second power driver stage, comprising the steps of, a) measuring an operating temperature of said first and second power driver stages, b) driving said motors to rotate at normal rotational rates when said measured temperature of said first and second power driver stages is below a first threshold temperature, c) driving said capstan motor with reduced power when said measured temperature is above said first threshold and below a second threshold temperature, and, d) controlling said capstan motor and said drum motor to achieve a quiescent state by progressively reducing power to said motors when said measured temperature is between said second and a third threshold temperature.

10. The control method of claim 9, wherein said step c) additionally includes, reducing said measured temperature of said first and second power driver stages when driving said capstan motor with reduced power.

11. The control method of claim 9, wherein said step c) also includes, reducing a rotational rate of said capstan motor relative to said normal rotational rate when driving said capstan motor with reduced power.

12. The control method of claim 9, wherein said step c) further includes, driving said drum motor to rotate at said normal rotational rate and sustaining image detection by a video drum coupled to said drum motor.

* * * * *